US009419893B2

(12) United States Patent
Chen et al.

(10) Patent No.: US 9,419,893 B2
(45) Date of Patent: Aug. 16, 2016

(54) TRAFFIC ENGINEERING RESOURCE COLLECTION AND COORDINATION

(71) Applicant: Futurewei Technologies, Inc., Plano, TX (US)

(72) Inventors: Huaimo Chen, Bolton, MA (US); Renwei Li, Fremont, CA (US)

(73) Assignee: Futurewei Technologies, Inc., Plano, TX (US)

( * ) Notice: Subject to any disclaimer, the term of this patent is extended or adjusted under 35 U.S.C. 154(b) by 80 days.

(21) Appl. No.: 14/076,952

(22) Filed: Nov. 11, 2013

(65) Prior Publication Data

US 2015/0131675 A1 May 14, 2015

(51) Int. Cl.
*H04L 12/28* (2006.01)
*H04L 12/723* (2013.01)
*H04L 12/911* (2013.01)
*H04L 12/803* (2013.01)

(52) U.S. Cl.
CPC ............. *H04L 45/507* (2013.01); *H04L 45/50* (2013.01); *H04L 47/125* (2013.01); *H04L 47/781* (2013.01); *H04L 47/822* (2013.01)

(58) Field of Classification Search
CPC .......... H04L 45/02; H04L 45/42; H04L 45/50
USPC .................. 370/351, 389, 400, 422
See application file for complete search history.

(56) References Cited

U.S. PATENT DOCUMENTS

| | | | |
|---|---|---|---|
| 6,144,661 A * | 11/2000 | Katsube | H04L 12/1836 370/390 |
| 6,643,258 B1 * | 11/2003 | Ise | H04L 12/5695 370/230 |
| 7,340,169 B2 * | 3/2008 | Ovadia et al. | 398/57 |
| 7,483,380 B2 * | 1/2009 | Metke | H04L 45/02 370/237 |
| 7,813,270 B2 * | 10/2010 | Acharya et al. | 370/225 |
| 7,818,450 B2 * | 10/2010 | Chen | H04L 45/02 370/351 |
| 8,000,233 B2 * | 8/2011 | Anderson et al. | 370/230 |
| 8,599,703 B2 * | 12/2013 | Dhillon | H04L 47/10 370/248 |
| 8,711,855 B1 * | 4/2014 | Murphy et al. | 370/390 |
| 8,885,463 B1 * | 11/2014 | Medved et al. | 370/228 |
| 8,953,500 B1 * | 2/2015 | Shen et al. | 370/256 |
| 2004/0202158 A1 * | 10/2004 | Takeno | H04L 45/02 370/389 |
| 2005/0044218 A1 * | 2/2005 | Couturier | H04L 12/5695 709/225 |
| 2006/0165224 A1 * | 7/2006 | Lee | 379/16 |
| 2009/0059937 A1 * | 3/2009 | Kanada | H04L 41/5003 370/401 |

OTHER PUBLICATIONS

Das, Saurav, et al., "MPLS with a Simple OPEN Control Plane", Optical Fiber Communication Conference and Exposition and the National Fiber Optic Engineers Conference (OFC/NFOEC), Los Angeles, California, Mar. 2011, 3 pages.

* cited by examiner

*Primary Examiner* — Dmitry H Levitan
(74) *Attorney, Agent, or Firm* — Conley Rose, P.C.; Grant Rodolph; William H. Dietrich

(57) ABSTRACT

In a central controller, a method for managing resources comprising sending a request to a node in a domain controlled by the central controller, wherein the request requests at least a portion of a resource of the node, receiving a response from the node, wherein the response contains information on the availability of the portion of the resource, and storing the information on the availability of the portion of the resource for use in establishing a multiprotocol label switching (MPLS) label switched path (LSP).

20 Claims, 6 Drawing Sheets

TRAFFIC ENGINEERING RESOURCE COLLECTION AND COORDINATION

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Multiprotocol label switching (MPLS) may be employed to perform traffic-engineering (TE) in internet protocol (IP) networks and to provide MPLS based layer 2 (L2) or layer 3 (L3) enterprise virtual private network (VPN) services. There are various existing solutions for providing MPLS on a service provider's network using a distributed control network. Such existing solutions may require each node (e.g., a router or a switch) to establish one or more tunnels to provide MPLS data communication. More recent solutions introduce the notion of a centrally controlled network for MPLS data communication in which the network operation is divided into two planes, for example, a control plane (e.g., residing in a tunnel central controller) and a data plane (e.g., residing in one or more nodes). In order to implement TE in a centrally controlled MPLS network, means for collecting and coordinating resources of various links within the network are needed.

SUMMARY

In at least one example embodiment, resources, such as traffic engineering (TE) resources and/or label resources, are managed in a central controller by collecting and coordinating resource information about links in a domain controlled by the central controller. The central controller may, for example, send a request to a node in the domain controlled by the central controller, wherein the request requests at least a portion of a resource of the node. The node may receive the request, and in response send information on the availability of the portion of the resource to the central controller. For example, a response may be sent that comprises the information. The central controller may receive the response from the node. The central controller may store the information on the availability of the portion of the resource. The response may indicate that the portion of the resource of the node is available, in which case the central controller may create a multiprotocol label switching (MPLS) label switched path (LSP) that includes the node and uses the portion of the resource indicated as available. Furthermore, the request sent by the controller may be a link-state advertisement (LSA) request, and the response may be a LSA response.

BRIEF DESCRIPTION OF THE DRAWINGS

For a more complete understanding of the present disclosure and the advantages thereof, reference is now made to the following brief description, taken in connection with the accompanying drawings and detailed description.

DETAILED DESCRIPTION

It should be understood at the outset that although an illustrative implementation of one or more example embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In centrally controlled networks utilizing multiprotocol label switching (MPLS) for data communication, a control plane in a central controller may be employed to establish tunnels along some nodes within the data plane, for example, to program and/or to control one or more nodes. In such existing solutions, it may be desirable to provide scalable and low-complexity means for coordinating and/or negotiating TE resources between the control plane and the one or more data planes.

This disclosure teaches link resource management in a centrally controlled MPLS network with a focus on collection of link resource information and coordination of resources across the MPLS network. Link resource information may be used to perform traffic engineering (TE) in centrally controlled MPLS networks. For example, paths may be created and traffic routed through the MPLS network based on link resource information. A central controller may be configured to coordinate and/or negotiate resources, such as TE resources and/or label resources, within the MPLS network, for example, between the central controller and one or more nodes within the centrally controlled domain (e.g., a data plane), for example, one or more nodes employing an interior gateway protocol (IGP), an agent of interface manager (AIM), traffic-engineering database (TEDB), or the like. The central controller may be employed to coordinate and negotiate TE resources to determine and/or establish the link bandwidth used for creating an MPLS TE label switched path (LSP) or tunnel. Similarly, the central controller may be employed to coordinate and negotiate label resources to determine and/or establish the labels used for creating an MPLS TE LSP or tunnel.

Figure 1:
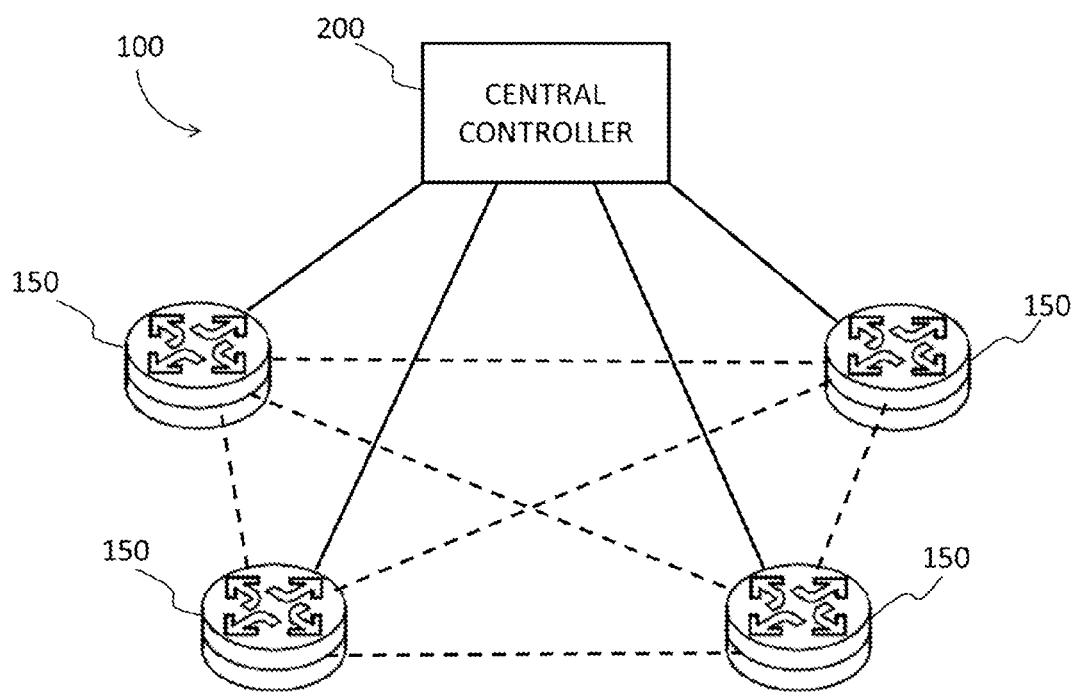
FIG. 1 is a schematic view of an example embodiment of an MPLS network.

FIG. 1 is an example embodiment of an MPLS network 100. The MPLS network 100 comprises a central controller 200 (sometimes referred to as a tunnel central controller (TCC)) in data communication and connected with a plurality of nodes 150 (e.g., a router or a switch). For illustrative purposes wired connections between the central controller 200 and each node are shown. The central controller 200 may be connected directly (e.g., via a wired or wireless connection) and/or indirectly (e.g., via one or more intermediate nodes) to each node 150 within the data plane. In an example embodiment, one or more of the nodes 150 may be a router configured to employ an IGP, a TEDB, an AIM, or any other suitable protocol as would be appreciated by one of ordinary skill in the art. For example, the router may be in data communication with one or more other routers within an area or portion of a domain controlled by the central controller 200 (sometimes referred to as a centrally controlled domain) and may be configured to store port (e.g., ingress ports and/or egress ports) connection information for one or more nodes. In an alternative example embodiment, one or more of the nodes 150 may be a switch configured to employ an AIM. For example, the switch may be configured to store local port (e.g., ingress ports and/or egress ports) connection information for the switch.

Figure 2:
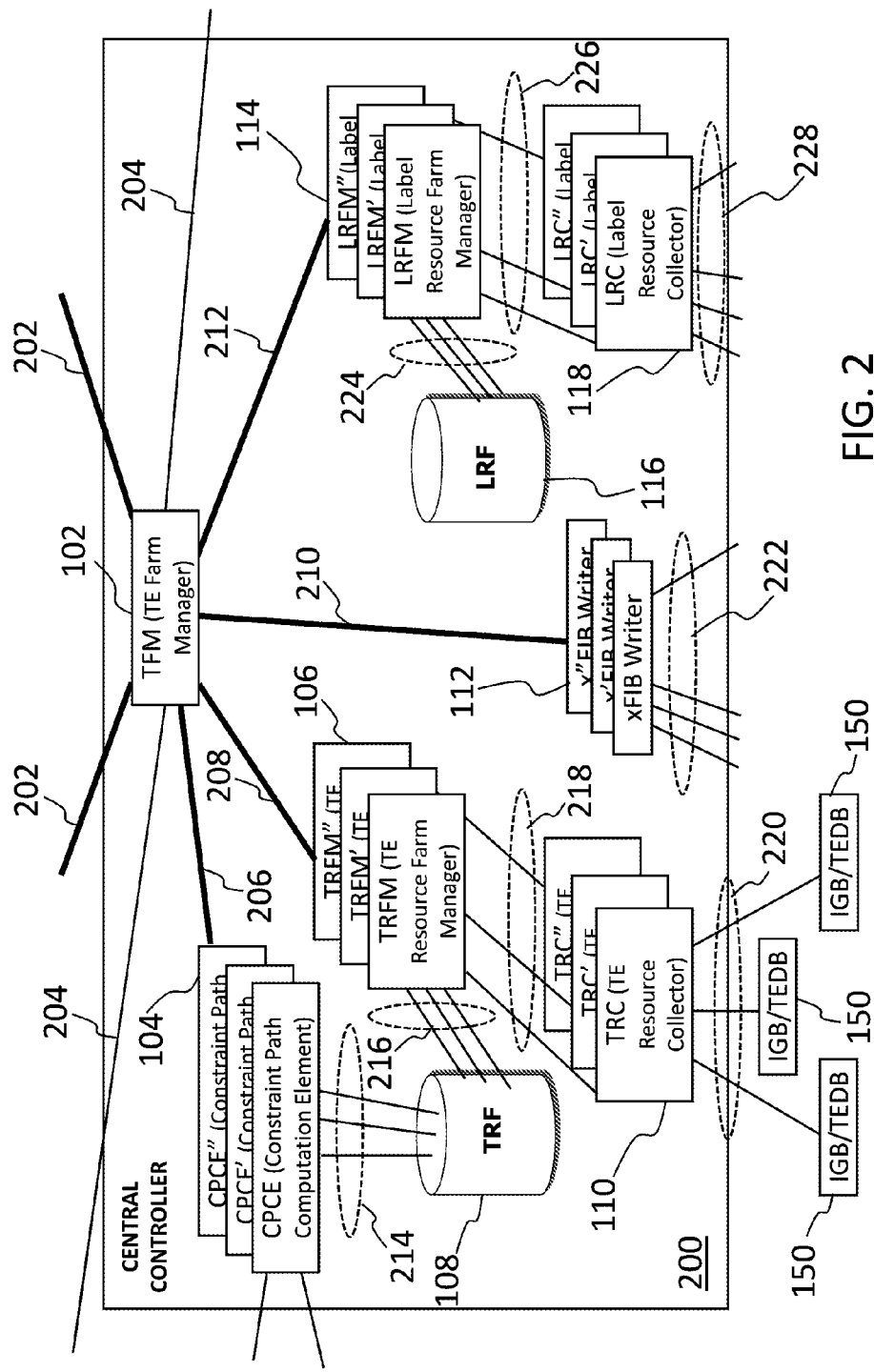
FIG. 2 is a schematic view of an example embodiment of a tunnel central controller.

FIG. 2 is a schematic view of an example embodiment of a central controller 200. The central controller 200 comprises a TE farm manager (TFM) 102, a plurality of constraint path computation elements (CPCEs) 104, a plurality of TE resource farm managers (TRFMs) 106, a TE resource farm (TRF) 108, a plurality of TE resource collectors (TRCs) 110, a plurality of cross forwarding information base (xFIB) writers 112, a plurality of label resource farm managers (LRFMs) 114, a label resource farm (LRF) 116, and a plurality of label resource collectors (LRCs) 118 configured as shown in FIG. 2. The functional units of the central controller 200 may be interconnected or linked via a plurality of interfaces and/or connections (e.g., wired and/or wireless connections). In the example embodiment of FIG. 2, the interfaces and/or connections are shown as one or more connections for illustrative purposes. Any number of suitable interface or connections may be employed as would be appreciated by one of ordinary skill in the art. For example, the central controller 200 may be configured such that TFM 102 is configured to interact with the CPCEs 104 via an interface 206, the TRFMs 106 via an interface 208, the xFIB writers 112 via an interface 210, and the LRFMs 114 via an interface 212. Additionally, in such an example embodiment, the TFM 102 may be configured to interact with one or more additional central controllers via an interface 204 and/or in data communication with one or more applications (e.g., layer 3 virtual private networks (L3VPNs), pseudo wire emulation edge-to-edge (PWE3), etc.) via an interface 202. Further, the CPCEs 104 may also interact with the TRF 108 via an interface 214. The TRFMs 106 may interact with the TRF 108 via an interface 216 and the TRCs 110 via an interface 218. The LRFMs 114 may interact with the LRF 116 via an interface 224 and the LRCs 118 via an interface 226.

Although the central controller 200 is illustrated as comprising a TFM 102, a plurality of CPCEs 104, a plurality of TRFMs 106, a TRF 108, a plurality of TRCs 110, a plurality of xFIB writers 112, a plurality of LRFMs 114, a LRF 116, and a plurality of LRCs 118, in one or more example embodiments, any other suitable configuration of components or functional units and/or combinations thereof may be additionally or alternatively incorporated within the central controller 200 for implementing the functionality of the central controller 200 described herein as would be appreciated by one of ordinary skill in the art upon viewing this disclosure.

The TFM 102 may be configured to create and/or delete LSP tunnels upon request, for example, by an application (e.g., a L3VPN). For example, the TFM 102 may be configured such that in response to receiving a tunnel create request, the TFM 102 may be configured to receive a LSP tunnel request, to obtain a network path for a LSP tunnel, to obtain label resource information for the LSP tunnel, and to provide routing information for the LSP tunnel. For example, the TFM 102 may be configured to receive a path (e.g., a network path) from the CPCE 104, to receive a label resource from the LRFM 114, to provide network bridging or routing information for the LSP tunnel via the xFIB writer 112, and to update the TRF 108. Additionally, the TFM 102 may be configured to communicate a create tunnel message, a delete tunnel message, a path request message, a path reply message, an update TE resource (TR) message, an update X connection message, a label request message, a label withdraw message, a label assign message, a label release message, and/or any other suitable messages within the central controller 200 as would be appreciated by one of ordinary skill in the art upon viewing this disclosure.

In an example embodiment, the CPCE 104 may be configured to compute an end-to-end shortest tunnel path, for example, upon request by the TFM 102. The xFIB writer 112 may be configured to provide network bridging or routing information, for example, to update a label forwarding information base (LFIB) in one or more routers. Additionally, the xFIB writer 112 may be configured to provide network bridging or routing information across multiple networking layers and/or with multiple interfaces 222 (e.g., optical links, copper wire links, etc.). The LRFM 114 may be configured to manage label resources in a centrally controlled domain and/or to allocate a label for a tunnel, for example, upon request by the TFM 102. For example, the LRFM 114 may be configured to receive label resource information via the LRC 118 and to update the LRF 116. The LRC 118 may be configured to coordinate and/or negotiate with each node 150 in a centrally controlled domain, e.g., via an interface 228, and to obtain label resource information for each node and/or interface attached to the node 150 in the centrally controlled domain. The TRFM 106 may be configured to manage the TE resources in a centrally controlled domain. For example, the TRFM 106 may be configured to receive TE resource information via the TRC 110 and to update the TRF 108. The TRC 110 may be coupled or linked to one or more nodes 150 within a centrally controlled domain. In the example embodiment of FIG. 2, the TRC 110 is configured to interact with a plurality of nodes 150 via an interface 220. The TRC 110 may be configured to coordinate and/or negotiate with one or more nodes 150 in a centrally controlled domain to obtain TE resource information and/or to obtain a TE topology of each area in the centrally controlled domain, as will be disclosed herein. Additionally, the TRC 110 may be configured to send TE resource information to the TRFM 106, for example, to update the TRF 108.

Figure 3:
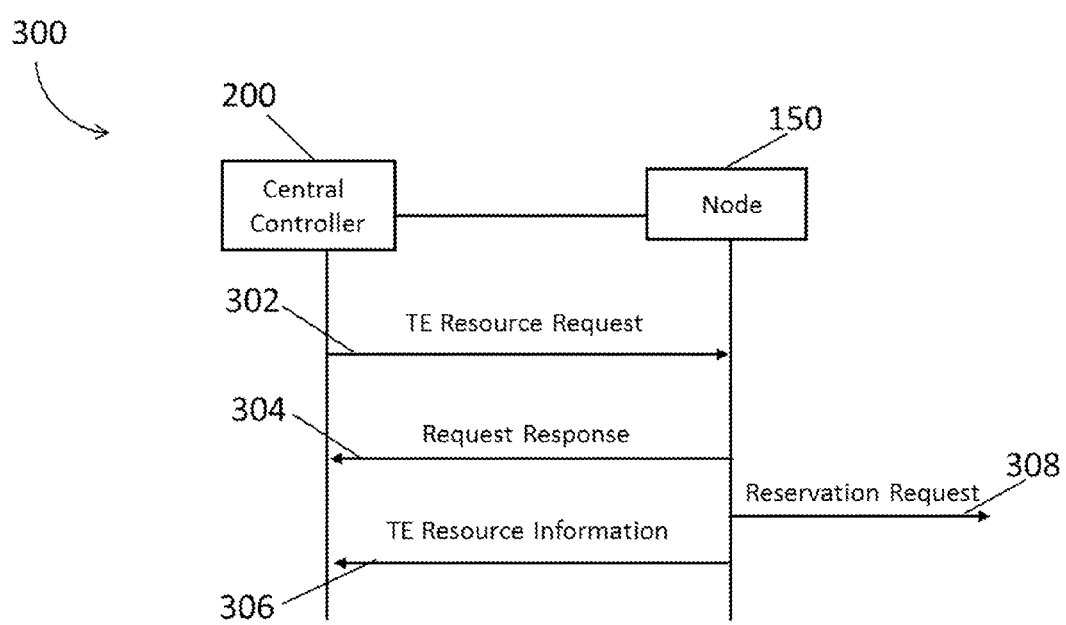
FIGS. 3 and 4 are example embodiments of a method for coordinating traffic engineering resources.

FIG. 3 is a method 300 for coordinating TE resources between a central controller, such as central controller 200, and a node 150 (e.g., a router or a switch). The method 300 begins at step 302. In step 302, a TRC, such as TRC 110, sends a TE resource request to one or more nodes 150 (e.g., a router or a switch) within every area of a centrally controlled domain. For example, in response to an application request, the central controller 200 (e.g., via the TRC 110) may send a TE request to each of the one or more nodes 150 within the centrally controlled domain. The TE resources request may comprise a request which indicates at least a portion of the TE resources of the node the TRC 110 desires. For example, the portion of the TE resources may be a percentage of link bandwidth, for example, about 10%, 15%, 20%, 25%, 30%, 35%, 40%, 45%, 50%, 60%, 70%, 80%, 90%, 100%, or any other suitable percentage as would be appreciated by one of ordinary skill in the art upon viewing this disclosure. Alternatively, the portion of the TE resources may be described in amount of link bandwidth, for example, about 10 megabits (MB) per second of link bandwidth per link in the network. Alternatively, the portion of the TE resources may be described in any other suitable format indicative of a portion of the desired TE resources as would be appreciated by one of ordinary skill in the art upon viewing this disclosure. In an example embodiment, the node 150 may determine the availability of the portion of TE resources. For example, the node 150 (e.g., a router) may check its Traffic Engineering Database (TEDB) to determine the availability of TE resources. One node in a network may have the TE information of all the nodes in a same network if OSPF/ISIS is running on every node. The TE information may be stored in a TEDB on each node. In step 304, the central controller 200 (e.g., via the TRC 110) receives a TE request response from each of the one or more nodes 150. For example, the TRC 110 may receive a TE request response from each of the one or more routers within each area of the centrally controlled domain and/or from each of the one or more switches. In an example embodiment, the TE request response may comprise a request confirmation indicating the portion of the TE resources of the node is available. Additionally or alternatively, in step 306, the TE request response may comprise TE resource information after the node 150 reserves the portion of the TE resources. The TE resource information may include, for each link of a node, the total bandwidth of the link and the portion of the bandwidth allocated to the central controller. Alternatively, the TE request response may comprise a request rejection indicating the portion of the TE resources of the node is unavailable and/or may comprise a reason for rejecting the request. Additionally, in step 308, the node 150 may request other nodes to reserve the portion of the TE resources, for example, via sending an LSA notification to one or more second nodes (e.g., other routers) in the same area to ask them to reserve the TE resources. In response to receiving an LSA notification, each of the one or more second nodes in the same area may update their TE LSAs according to the LSA notification. Additionally, each of the second nodes may send the TE resource information of the TE LSAs and/or the TE resource reservations to other nodes such as the node 150 in the area. Further, in such an example embodiment, upon the node 150 receiving the TE resource information of the TE LSAs and/or the TE resource reservations, the node 150 may send the TE resource information to the central controller 200 (e.g., via the TRC 110). In an example embodiment, the TE resource information may be in LSA format. Alternatively, the TE resource information may be in any other suitable format as would be appreciated by one of ordinary skill in the art upon viewing this disclosure. In response to receiving TE resource information, the central controller 200 may determine the availability of the portion of TE resources. For example, the TRC 110 may determine if the portion of the TE resources is available in response to receiving a request confirmation or a request rejection. In an example embodiment, in response to receiving a request confirmation the TRC 110 may thereby determine the portion of the TE resources of the node is available. Upon determining the portion of the TE resources of the node is available, the TRC 110 may compute the TE resources allocation and/or bandwidth for each link within the network. Alternatively, in response to receiving a request rejection, the TRC 110 may send a second TE request. For example, the second TE request may comprise a request for a reduced portion of the TE resources. In response to sending the second TE resource request, the TRC 110 may receive a second TE request response (e.g., a request confirmation or request rejection) from each of the one or more nodes 150 and may determine if the portion of TE resources is available. The TRC 110 may send the TE resource information to the TRFM 106. For example, upon receiving TE resource information from each node 150 or area of the centrally controlled domain, the TRC 110 may send the TE resource information to the TRFM 106. Additionally or alternatively, the TRC 110 may send computed TE resource allocation information to the TRFM 106. In an example embodiment, the TE resource information may be used by the central controller 200 to create an MPLS TE LSP or tunnel.

Figure 4:
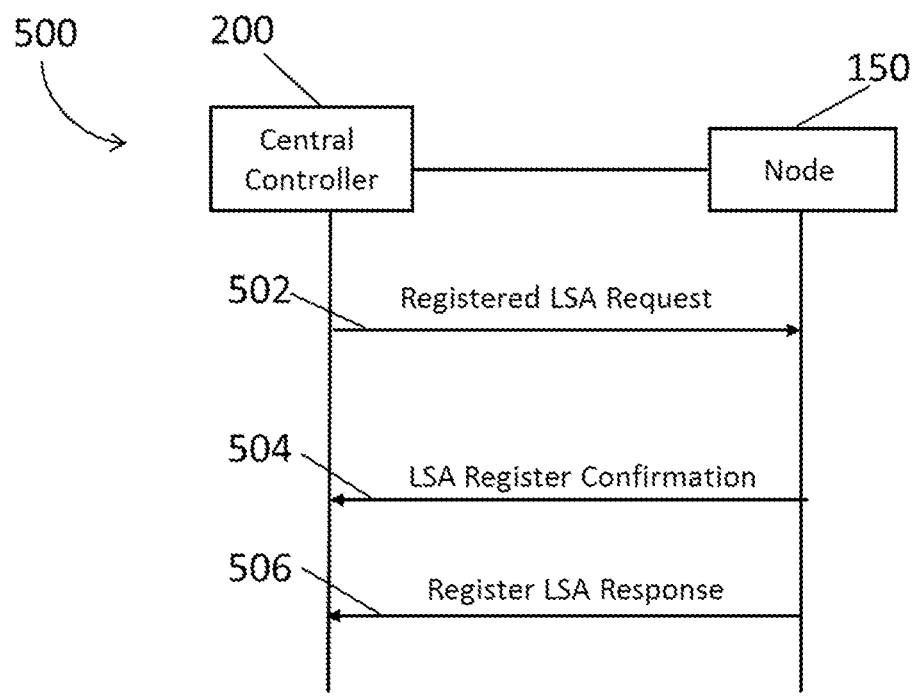

FIG. 4 is another method 500 for coordinating TE resources between a central controller, such as central controller 200, and a node 150. The method 500 begins at step 502. In step 502, the central controller 200 (e.g., via the TRC 110) sends a register LSA request to one or more nodes 150. For example, the TRC 110 may send a node 150 (e.g., a router) in each area within the centrally controlled domain a register LSA request for type 10 LSA and/or type 2 LSA. Additionally or alternatively, the register LSA request may be for any other suitable type of LSA as would be appreciated by one of ordinary skill in the art upon viewing this disclosure. In step 504, the central controller 200 (e.g., via the TRC 110) receives a register LSA confirmation from each of one or more of the nodes 150. In an example embodiment, shown as step 506, in response to receiving the register LSA request, the nodes 150 may send the TRC 110 a LSA register response. Additionally or alternatively, in response to receiving the register LSA request, each of the one or more nodes 150 may send the TRC 110 a register LSA response, for example, all the type 10 LSAs and/or the type 2 LSAs in their link state database. For example, the type 10 LSAs may comprise the current TE resource information in the network. Additionally, the type 2 LSAs may comprise the nodes attached to a broadcast interface. In such an example embodiment, a complete TE resource topology may be constructed based on the LSA information provided. The TRC 110 may send the TE resource information to the TRFM 106. For example, upon receiving the LSA register response (e.g., the TE resource information) from each of one or more nodes 150, the TRC 110 may send the TE resource information to the TRFM 106 to update and/or store the TE resource information into the TRF 108. In an example embodiment, the TE resource information may be used by the central controller 200 to create an MPLS TE LSP or tunnel.

Figure 5:
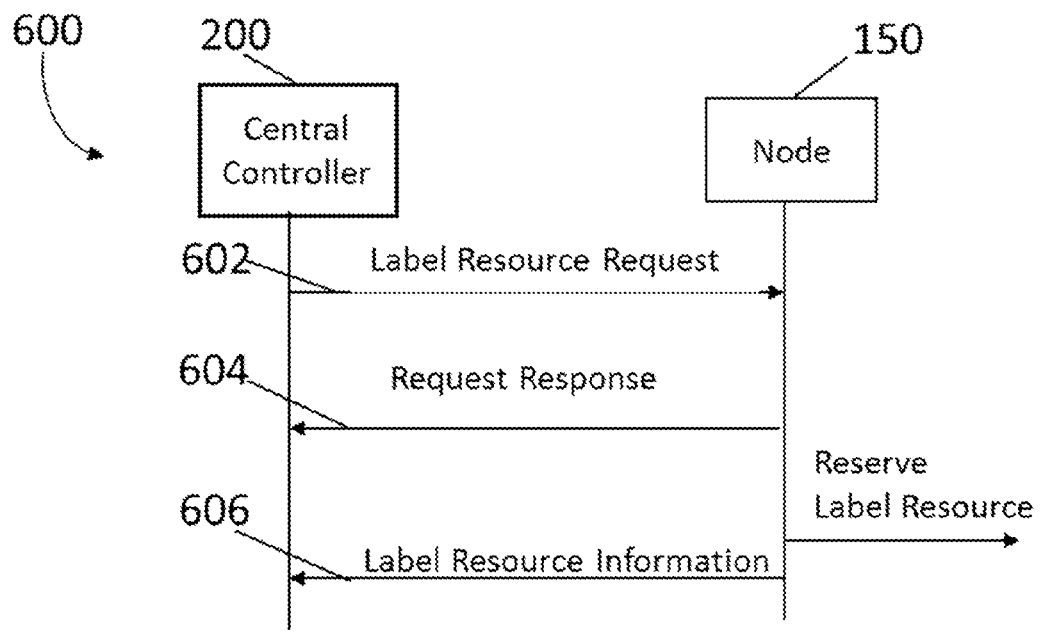
FIG. 5 is an example embodiment of a method for coordinating label resources.

FIG. 5 is a method 600 for coordinating label resources between a central controller, such as central controller 200, and a node 150 (e.g., a router or a switch). The method 600 begins at step 602. In step 602, a LRC, such as LRC 118, sends a label resource request to one or more nodes 150 within every area of a centrally controlled domain. For example, in response to an application request, the central controller 200 (e.g., via the LRC 118) may send a label request to each of the one or more nodes 150 within the centrally controlled domain. The label resources request may comprise a request which indicates at least a portion of the label resources of the node the LRC 118 desires. For example, the portion of the label resources may be a percentage of labels, for example, about 10%, 15%, 20%, 25%, 30%, 35%, 40%, 45%, 50%, 60%, 70%, 80%, 90%, 100%, or any other suitable percentage as would be appreciated by one of ordinary skill in the art upon viewing this disclosure. Alternatively, the portion of the label resources may be described in a number of labels, for example, 10,000 labels from the node or 10,000 labels from each of the interfaces of the node if the interface labels are used. Alternatively, the portion of the label resources may be described in any other suitable format indicative of a portion of the desired label resources as would be appreciated by one of ordinary skill in the art upon viewing this disclosure. In step 604, the central controller 200 (e.g., via the LRC 118) receives a label request response from each of the one or more nodes 150. For example, the LRC 118 may receive a label request response from each of the one or more routers within each area of the centrally controlled domain and/or from each of the one or more switches. In an example embodiment, the label request response may comprise a request confirmation indicating the portion of the label resources of the node is available. Additionally or alternatively, in step 606, the label request may comprise the label resource information after the node 150 reserves the portion of the label resources. Alternatively, the label request response may comprise a request rejection indicating the portion of the label resources of the node is unavailable and/or may comprise a reason for rejecting the request. In response to receiving label resource information, the central controller 200 may determine the availability of the portion of label resources. For example, the LRC 118 may determine if the portion of the label resources is available in response to receiving a request confirmation or a request rejection. In an example embodiment, in response to receiving a request confirmation the LRC 118 may thereby determine the portion of the label resources of the node is available. Upon determining the portion of the label resources of the node is available, the LRC 118 may send the label resources to LRFM, which may store the label resources into LRF. Alternatively, in response to receiving a request rejection, the LRC 118 may send a second label request. For example, the second label request may comprise a request for a reduced portion of the label resources. In response to sending the second label resource request, the LRC 118 may receive a second label request response (e.g., a request confirmation or request rejection) from each of the one or more nodes 150 and may determine if the portion of label resources is available. The LRC 118 may send the label resource information to the LRFM. For example, upon receiving label resource information from each node 150 or area of the centrally controlled domain, the LRC 118 may send the label resource information to the TRFM. The label resource information may be used by the central controller 200 to create an MPLS TE LSP or tunnel.

Figure 6:
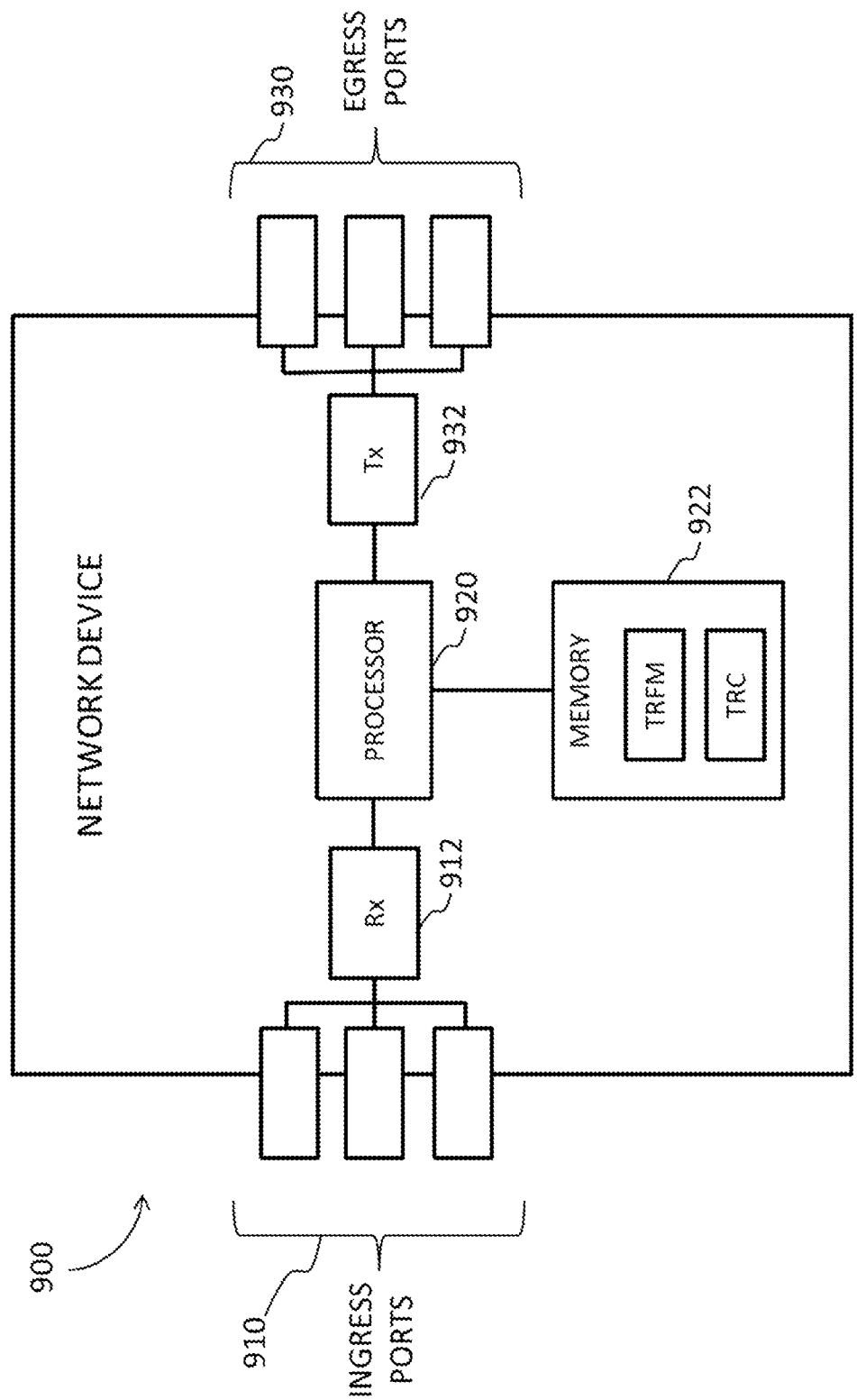
FIG. 6 is a schematic view of an example embodiment of a network device.

FIG. 6 illustrates an embodiment of a network device or apparatus 900, which may be any device configured to transport data frames or packets through a network. The network device 900 may comprise one or more ingress ports 910 coupled to a receiver (Rx) 912, which may be configured for receiving packets or frames, objects, options, and/or Type Length Values (TLVs) from other network components. The network device 900 may comprise a logic unit or processor 920 coupled to the receiver 912 and configured to process the packets or otherwise determine to which network components to send the packets. The processor 920 may be implemented using hardware or a combination of hardware and software. The processor 920 may be implemented as one or more central processor unit (CPU) chips, cores (e.g., a multi-core processor), field-programmable gate arrays (FPGAs), application specific integrated circuits (ASICs), and/or digital signal processors (DSPs). The network device 900 may further comprise a memory 922.

The memory 922 may comprise secondary storage, random access memory (RAM), and/or read-only memory (ROM) and/or any other type of storage. The secondary storage may comprise one or more disk drives or tape drives and is used for non-volatile storage of data and as an over-flow data storage device if the RAM is not large enough to hold all working data. The secondary storage may be used to store programs that are loaded into the RAM when such programs are selected for execution. The ROM is used to store instructions and perhaps data that are read during program execution. The ROM is a non-volatile memory device that typically has a small memory capacity relative to the larger memory capacity of the secondary storage. The RAM is used to store volatile data and perhaps to store instructions. Access to both the ROM and the RAM is typically faster than to the secondary storage. Additionally, the memory 922 may comprise instructions and/or data to provide the functionality of one or more components or functional units (e.g., a TRFM, a TRC, a TRF, a LRC) of a central controller 200 as shown in FIG. 2.

The network device 900 may also comprise one or more egress ports 930 coupled to a transmitter (Tx) 932, which may be configured for transmitting packets or frames, objects, options, and/or TLVs to other network components. Note that, in practice, there may be bidirectional traffic processed by the network device 900, and some ports may both receive and transmit packets. In this sense, the ingress ports 910 and the egress ports 930 may be co-located or may be considered different functionalities of the same ports that are coupled to transceivers (Rx/Tx). The processor 920, the receiver 912, and the transmitter 932 may also be configured to implement or support any of the procedures and methods described herein, such as the methods for coordinating and/or negotiating TE resources 300, 400, and 500.

It is understood that by programming and/or loading executable instructions onto the network device 900, at least one of the processor 920 and the memory 922 are changed, transforming the network device 900 in part into a particular machine or apparatus (e.g., a central controller). The executable instructions may be stored on the memory 922 and loaded into the processor 920 for execution. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner, as a machine controlled by a new ASIC is a particular machine or apparatus, likewise a computer that has been programmed and/or loaded with executable instructions may be viewed as a particular machine or apparatus.

Any processing of the present disclosure may be implemented by causing the processor, such as processor 920, to execute a computer program. In this case, a computer program product can be provided to a network device, such as network device 900, using any type of non-transitory computer readable media, such as memory 922. The computer program product may be stored in a non-transitory computer readable medium in the computer or the network device. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), compact disc ROM (CD-ROM), compact disc recordable (CD-R), compact disc rewritable (CD-R/W), digital versatile disc (DVD), Blu-ray (registered trademark) disc (BD), and semiconductor memories (such as mask ROM, programmable ROM (PROM), erasable PROM, flash ROM, and RAM). The computer program product may also be provided to a computer or a network device using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

In an example embodiment, a central controller 200 employing a TRC, such as TRC 110, and/or a method of use, as disclosed herein or in some portion thereof, may be advantageously employed to coordinate and/or negotiate TE resources between a central controller and one or more nodes in a centrally controlled MPLS network. For example, a central controller may coordinate and/or negotiate TE resources with one or more nodes within the centrally controlled domain to determine and/or establish the link bandwidth used for creating a tunnel (e.g., an MPLS TE LSP). Therefore, the example embodiments disclosed herein provide a simple and scalable means for coordinating and/or negotiating TE resources between the central controller and the one or more nodes in a centrally controlled MPLS network.

At least one example embodiment is disclosed and variations, combinations, and/or modifications of the example embodiment(s) and/or features of the example embodiment(s) made by a person having ordinary skill in the art are within the scope of the disclosure. Alternative example embodiments that result from combining, integrating, and/or omitting features of the example embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. The use of the term "about" means±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. All documents described herein are incorporated herein by reference.

While several example embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various example embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

We claim:

1. A method for managing resources in a central controller, comprising:
    sending a request to a node in a domain controlled by the central controller, wherein the request instructs the node to reserve at least a portion of a resource of the node and triggers the node to notify at least one other node within a centrally controlled domain to reserve at least a portion of its own resource;
    receiving a response from the node, wherein the response contains information on an availability of the portion of the resource of the node and the portion of the resource of the other node based on the request made by the central controller; and
    storing the information on the availability of the portion of the resource for use in establishing a multiprotocol label switching (MPLS) label switched path (LSP).

2. The method of claim 1, further comprising:
    sending a second request to a second node in another area in the domain controlled by a central controller, wherein the second request requests at least a portion of a resource of the second node;
    receiving a second response from the second node, wherein the second response contains information on the availability of the portion of the resource of the second node reserved for the central controller; and
    storing the information on the availability of the portion of the resource of the second node for use in establishing the MPLS LSP.

3. The method of claim 1, wherein the node employs an interior gateway pr (IGP), a traffic engineering database (TEDB), or an agent of interface module (AIM).

4. The method of claim 1, wherein the portion of the resource is a percentage of a link bandwidth for a particular link of the node.

5. The method of claim 1, wherein the response indicates the portion of the resource of the node is unavailable.

6. The method of claim 5, wherein the response indicates the portion of the resource of the node is unavailable, further comprising:
    in response to determining the portion of the resource of the node is unavailable:
    sending a second request to the node, wherein the second request requests a reduced portion of the resource; and
    receiving a second response from the node, wherein the second response indicates the reduced portion of the resource is available.

7. The method of claim 1, wherein the response indicates the portion of the resource of the node is available and comprises resource information.

8. The method of claim 7, further comprising computing resource allocation for a link using the resource information.

9. The method of claim 1, wherein the portion of the resource is a percentage of a label resource of the node.

10. The method of claim 1, further comprising:
receiving an LSP tunnel request;
in response the LSP tunnel request:
- obtaining a network path for an ISP tunnel;
- obtaining and reserving TE resources for the LSP tunnel;
- obtaining and reserving label resources for the LSP tunnel; and
- writing cross connections for the LSP tunnel.

11. A method for managing traffic engineering (TE) resources in a node, comprising:
receiving a request from a central controller, wherein the request instructs the node to reserve at least a portion of a TE resource of the node and triggers the node to notify at least one other node within a centrally controlled domain to reserve at least a portion of its own resource; and
sending information on an availability of the portion of the TE resource.

12. The method of claim 11, wherein the information on the availability of the portion of the TE resource indicates the portion of the TE resource of the node is unavailable.

13. The method of claim 11, wherein the information on the availability of the portion of the TE resource indicates the portion of the TE resource of the node is available and comprises TE resource information.

14. The method of claim 11, further comprising sending a reservation to a second node, wherein the reservation triggers updating a link-state advertisement (LSA) for the second node.

15. The method of claim 11, wherein the node is configured to employ an interior gateway protocol (IGP), a traffic engineering database (TEDB), or an agent of interface manager (AIM).

16. The method of claim 11, wherein the portion of the TE resource of the node is available, the method further comprising:
reserving the portion of the TE resource for the central controller.

17. A computer program product comprising computer executable instructions stored on a non-transitory computer readable medium such that when executed by a processor cause a central controller to:
send a traffic engineering (TE) resources request to a node, wherein the request instructs the node to reserve at least a portion of a resource of the node and triggers the node to notify at least one other node within a centrally controlled domain to reserve at least a portion of its own resource;
receive a link-state advertisement (LSA) response, wherein the LSA response comprises information on an availability of a portion of the TE resource; and
store the information on the availability of the portion of the TE resource.

18. The computer program product of claim 17, wherein the response indicates the portion of the TE resource of the node is available, further comprising instructions that cause the central controller to:
create a multiprotocol label switching (MPLS) label switched path (LSP).

19. The computer program product of claim 18, wherein the portion of the TE resource is a percentage of a link bandwidth for a particular link of the node.

20. The computer program product of claim 17, wherein the node employs an interior gateway protocol (IGP), a traffic engineering database (TEDB), or an agent of interface module (AIM).

* * * * *